US009143292B2

(12) United States Patent
Lu et al.

(10) Patent No.: US 9,143,292 B2
(45) Date of Patent: Sep. 22, 2015

(54) METHOD AND APPARATUS FOR CONTROLLING A SIGNAL PATH OF A RADIO COMMUNICATION (71) Applicant: Telefonaktiebolaget L M Ericsson (publ), Stockholm (SE)

(72) Inventors: Chenguang Lu, Sollentuna (SE); Kim Laraqui, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 163 days.

(21) Appl. No.: 13/993,570

(22) PCT Filed: May 22, 2013

(86) PCT No.: PCT/SE2013/050580
§ 371 (c)(1),
(2) Date: Jun. 12, 2013

(87) PCT Pub. No.: WO2013/010915
PCT Pub. Date: Jan. 24, 2012

(65) Prior Publication Data
US 2014/0348074 A1 Nov. 27, 2014

(51) Int. Cl.
H04L 5/00 (2006.01)
H04W 28/16 (2009.01)
H04W 88/08 (2009.01)

(52) U.S. Cl.
CPC .............. H04L 5/003 (2013.01); H04W 28/16 (2013.01); H04W 88/085 (2013.01)

(58) Field of Classification Search
CPC ...... H04W 88/08; H04W 72/04; H04W 28/16
See application file for complete search history.

(56) References Cited

U.S. PATENT DOCUMENTS

2008/0225816 A1* 9/2008 Osterling et al. ............. 370/342
2009/0017864 A1* 1/2009 Keevill et al. ............. 455/552.1

(Continued)

FOREIGN PATENT DOCUMENTS

EP        2 525 623 A2    11/2012
WO    WO 2004/019524 A1    3/2004

OTHER PUBLICATIONS

International Search Report, PCT Application No. PCT/SE2013/050580, Feb. 4, 2014.

(Continued)

Primary Examiner — Alex Skripnikov
Assistant Examiner — Calvin Hsieh
(74) Attorney, Agent, or Firm — Myers Bigel Sibley & Sajovec, P.A.

(57) ABSTRACT

A method and a remote digital unit in a central office of a core network, for handling a radio communication for a mobile terminal being connected to an access point at a local site. The remote digital unit determines that the mobile terminal can be served locally by a local digital unit connected to a local signal switching unit at the local site, and instructs the local digital unit to locally process signals to or from the mobile terminal in the communication. The remote digital unit further schedules the signals over a radio interface between the mobile terminal and the access point, and sends updated scheduling information to the local digital unit to indicate the scheduling, thereby enabling the local digital unit to handle the radio communication according to the updated scheduling information. In this way, the functionality of a base station is divided into a relatively simple digital unit and switching function at the local site and a more advanced digital unit with scheduling function at the central office, such that the costs for implementing radio access at a local site are low and tromboning of communicated signals over the core network can be avoided.

15 Claims, 6 Drawing Sheets

(56) References Cited

U.S. PATENT DOCUMENTS

| | | | |
|---|---|---|---|
| 2009/0082053 A1* | 3/2009 | Wei et al. | 455/522 |
| 2009/0092117 A1* | 4/2009 | Jiang et al. | 370/342 |
| 2012/0039214 A1* | 2/2012 | Kim et al. | 370/254 |
| 2012/0176980 A1 | 7/2012 | Moon et al. | |
| 2012/0184294 A1* | 7/2012 | Stojanovski et al. | 455/456.1 |

OTHER PUBLICATIONS

Written Opinion of the International Searching Authority, PCT Application No. PCT/SE2013/050580, Feb. 4, 2014.

Clark Chen et al: "Suggestions on Potential Solutions to C-RAN", NGMN Alliance, Version 4.0; XP002704068; Jan. 3, 2013; pp. 1-41; Retrieved from: URL:http://www.ngmn.org/uploads/media/NGMN_CRAN_Suggestions_on_Potential_Solutions_to_CRAN.pdf.

China Mobile Research Institute, "C-RAN, The Road Towards Green RAN", Internet Citation, Version 2.5; XP002700746; Oct. 2011, pp. 1-48; Retrieved from: URL:http://labs.chinamobile.com/cran/wp-content/uploads/CRAN_white_paper_v2_5_EN(1).pdf.

* cited by examiner

METHOD AND APPARATUS FOR CONTROLLING A SIGNAL PATH OF A RADIO COMMUNICATION

CROSS REFERENCE TO RELATED APPLICATION

This application is a 35 U.S.C. §371 national stage application of PCT International Application No. PCT/SE2013/050580, filed in the English language on 22 May 2013, the disclosure and content of which is incorporated by reference herein in its entirety.

TECHNICAL FIELD

The present disclosure relates generally to a remote digital unit and a method therein for controlling a radio communication for a mobile terminal being connected to an access point at a local site.

BACKGROUND

In recent years, the use of mobile phones, "smartphones", laptops and tablets for wireless communication of speech and data has grown immensely such that the demands for capacity, performance and flexibility in public cellular networks for radio communication has increased dramatically to meet this growth. The capacity of a cellular network is dependent on a range of factors such as the number and size of cells, available radio bandwidth, usage of radio resources, configuration of hardware and software, and so forth. For example, multiple small cells may be introduced in addition to a large macro cell to increase capacity locally in limited areas with dense traffic, hence referred to as "hot spots", within the macro cell. Such small cells within a macro cell are often referred to as "pico cells" although other similar names may also be used for cells that can be employed in addition to a macro cell, such as micro cell, femto cell, etc.

It is generally believed that the majority of radio traffic will be generated in indoor environments, and in this respect certain buildings or otherwise well-defined locations can be identified as hot spots in terms of expected traffic intensity. In that case, the above-described small cells may be created to off-load larger macro cells of a cellular network by providing multiple low-powered access points in a building inhabited or visited by several terminal users. The term "local site" will be used in this disclosure to represent any such limited and well-defined location, either indoor or outdoor, public or private, in which access points are installed to cover small cells located within or close to a macro cell area. Further, the term "mobile terminal" will represent any device or user equipment capable of radio communication with the above access points, including but not limited to mobile phones, smartphones, laptops and tablets.

At such a local site, one or more access points with antennas can be installed which are connected to a core part of the cellular network, e.g. via switches or the like. The local site discussed in this disclosure may be an office of an enterprise or an organization, a hotel, an airport, a shopping mall, a residence, a building with several apartments, to mention a few non-limiting examples. When communicating over an access point installed in a local site, the mobile terminals are often situated quite close to the access point antenna and relatively low transmission power is therefore usually sufficient to achieve proper signal reception, either at the mobile terminal for downlink signals or at the access point for uplink signals, thus typically not causing much radio interference in the cellular network. Further, radio communication over access points covering a limited area of a local site is appropriate also because mobile terminals are typically not fast moving when present in such locations.

Figure 1:
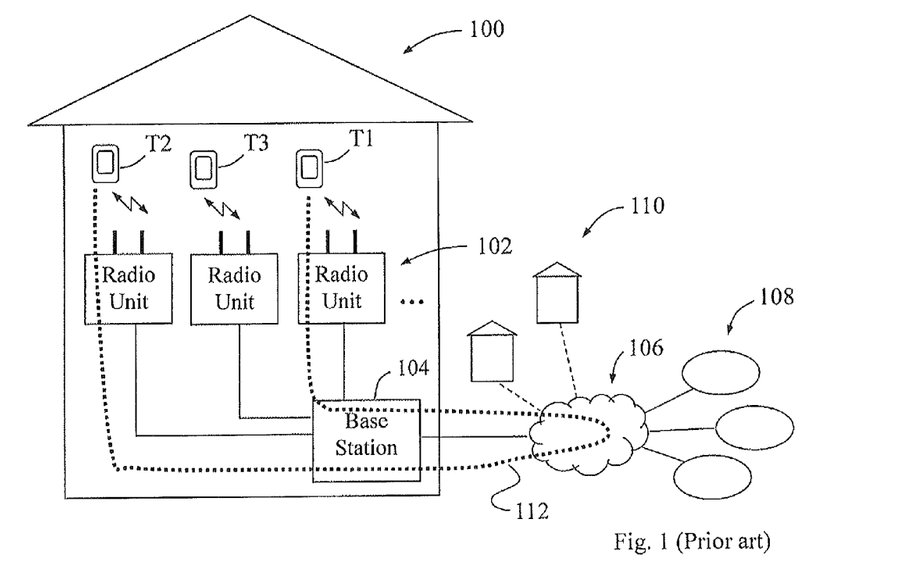
FIG. 1 is a communication scenario illustrating the signal path of a radio communication at a local site, according to the prior art.

FIG. 1 illustrates a conventional arrangement of a local site 100, here illustrated as a building, having multiple access points 102 connected to a base station 104 or the like which provides a link to a core part 106 of a cellular network which in turn is connected to various service providers and other services networks, e.g. over the Internet, which in this context are schematically represented as a "service edge" 108. The service edge 108 may be comprised of various servers, switches, routers and other network or service provider components which are not necessary to outline in any detail in this disclosure.

In this example, three exemplifying access points 102 are shown, each comprising at least an antenna and a radio unit, which are connected to the base station 104 being installed at the local site, e.g. in the basement of the building. Three mobile terminals T1, T2 and T3 are also shown being connected to respective access points 102. In this scenario, any signals to or from each mobile terminal are routed over the base station 104 and the core part 106 of the cellular network. Any number of further local sites 110 may be served by the core part 106 in a similar manner.

It is quite common, at least in certain types of local sites, that two mobile terminals in the same local site communicate with each other. In the example shown in FIG. 1, terminals T1 and T3 communicate with each other and the signals back and forth in this communication are conventionally routed via the base station 104 over the core part 106 and back again to the local site 100, as illustrated by the dotted line 112, thus forming a "trombone-like" signal path over the core part 106.

Figure 2:
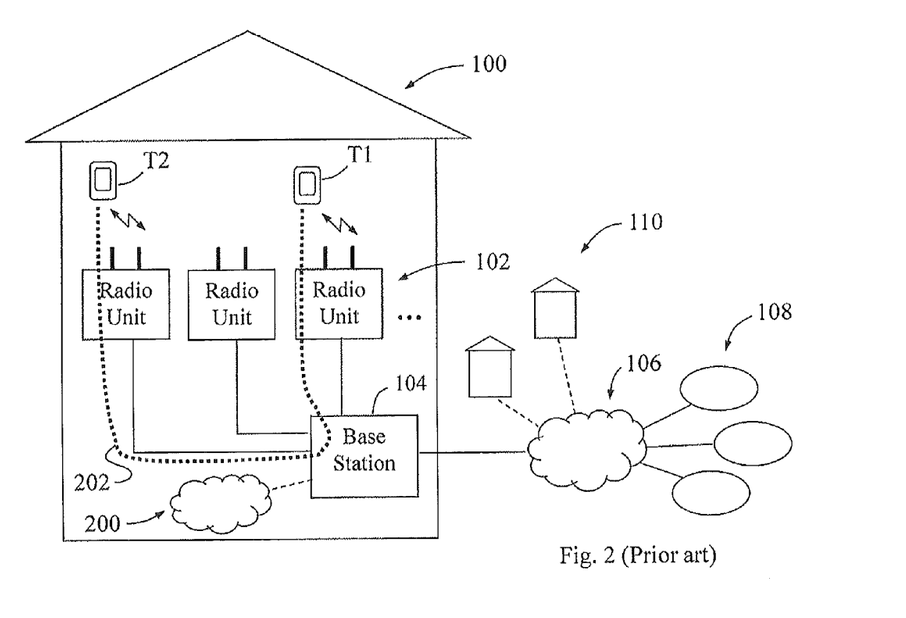
FIG. 2 is another communication scenario illustrating the signal path of a radio communication at a local site when tromboning is avoided, according to the prior art.

FIG. 2 illustrates another proposed arrangement in a local site 100, using the same numerals for similar components as in FIG. 1, where the above-described "tromboned" signal path is avoided by routing the signals locally by the base station 104 over a local or proprietary network 200 with one or more servers and switches that can be used to serve the terminals locally within the local site, if applicable. The base station 104 is able to determine that one or more mobile terminals can be served locally by equipment present within the local site 100, e.g. when two terminals T1 and T2 communicate with one another as in the previous example. In this example, the signals communicated between terminals T1 and T2 are routed over the base station 104 but not over the core part 106 of the cellular network, as illustrated by the dotted line 202, and very limited resources in the core part 106, e.g. in a Home Subscription Service, HSS, need to be occupied for setting up the signal flow. Another example where this can be employed is when a locally served mobile terminal is in communication with a server connected to the local network 200, which server could be placed in the local site 100 or be connected thereto. The traffic between the terminal and such a server could be routed over the local network 200 via the base station 104, without going over the cellular network's core, in the manner described above.

Since the radio traffic over the access points 102 takes place over a frequency spectrum allocated to, and paid by, the cellular network, it is natural that the operator of the cellular network wants to control the usage of radio resources within that frequency spectrum at the local site in order to coordinate it with the usage of radio resources in other parts of the network and to optimize the capacity and quality in the network. For example, the operator typically wants to control and schedule radio resources to different mobile terminals at the local site 100 in a way that minimizes the amount of harmful interference between different radio communications and to use the limited amount of radio resources efficiently in the network. The base station 104 is therefore typically controlled by the operator of the cellular network, unless base station 104 is isolated from the macro node covering the area.

However, it is a drawback that the above-described conventional arrangements of FIGS. 1 and 2 and others require a fully equipped base station at the local site, which is quite costly to install and maintain. In order to reduce the costs for deploying access points at local sites for radio communication, it has been suggested to move at least some costly parts of the base station to a more centralized location such as a central office or the like which can serve several such local sites.

An example of this is shown in WO 2004/019624 A1 where costly installations at a local site are avoided by placing the radio equipment of a base station in another location remote from the local site where the antennas are located. In this way, the costs for deploying extensive radio coverage in indoor locations and other local sites where heavy traffic is expected, can be reduced, particularly if a local infrastructure with antennas and cables is already in place such as when a local broadband access has been installed. However, when the base station is located remote in this way, it is not possible to avoid tromboning with the above-described solution of FIG. 2 since that would still require a fully equipped base station at the local site.

SUMMARY

It is an object of embodiments described herein to address at least some of the problems and issues outlined above. It is possible to achieve this object and others by using a method and a remote digital unit as defined in the attached independent claims.

According to one aspect, a method is performed by a remote digital unit for handling a radio communication for a mobile terminal which is connected to an access point at a local site. The remote digital unit is capable of signal processing and is implemented in a central office associated with a core network and remote from the local site. The core network is part of a public cellular network. In this method, the remote digital unit determines that the mobile terminal can be served locally by a local digital unit associated with the local site. The local digital unit is capable of signal processing and connected to a local signal switching unit at the local site. The remote digital unit then instructs the local digital unit to locally process signals to or from the mobile terminal in the radio communication.

The remote digital unit further schedules the signals over a radio interface between the mobile terminal and the access point during the radio communication, and sends updated scheduling information to the local digital unit during the radio communication to indicate the scheduling of said signals over the radio interface. Thereby, the local digital unit is enabled to handle said radio communication over the radio interface according to the updated scheduling information.

According to another aspect, a remote digital unit is provided configured to handle a radio communication for a mobile terminal being connected to an access point at a local site. The remote digital unit is capable of signal processing and is implemented in a central office associated with a core network and remote from the local site. The core network is part of a public cellular network.

The remote digital unit comprises a logic unit configured to determine that the mobile terminal can be served locally by a local digital unit associated with the local site and being capable of signal processing and connected to a local signal switching unit at the local site. The remote digital unit further comprises an instructing unit configured to instruct the local digital unit to locally process signals to or from the mobile terminal in the radio communication, and a scheduling unit configured to schedule the signals over a radio interface between the mobile terminal and the access point during the radio communication. The remote digital unit also comprises a sending unit configured to send updated scheduling information to the local digital unit to indicate the scheduling of the signals over the radio interface. Thereby, the local digital unit is enabled to handle said radio communication over the radio interface according to the updated scheduling information.

Advantages of the above method and remote digital unit, e.g. in terms of costs and efficiency, can be achieved as the necessary intelligence and complexity is basically placed in the remote digital unit at the central office while the local digital unit may be a much simpler component of limited costs since it is only required to act according to instructions and scheduling information from the remote digital unit. An operator of the cellular network is able to fully control the radio communication at the local site by means of the remote digital unit while the above-described tromboning of signals over the core network can also be avoided without requiring a full base station equipment at the local site. Thus, virtually no resources are used in the core network for the actual signal flow and latency can thus be limited in the communication.

The above method and remote digital unit may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to enable radio traffic to and from mobile terminals at a local site without having to route all the communicated signals over a remote core network of a public cellular network as in the above-described tromboning scenario. This can be accomplished by employing a remote Digital Unit, DU, in a central office or the like associated with the remote core network and controlled by the public cellular network, and by also employing a local DU in the local site.

In this setup, the core network is thus "remote" from the local site in the sense that the local site is connected to the remote DU in the central office by means of an external communication link that may extend over a substantial length, without limitation to the embodiments to be described below. The remote DU and the local DU are both capable of processing signals being communicated to or from a mobile terminal over an access point in the local site, e.g. processing baseband signals. The remote DU may serve multiple local sites in the manner described herein. In this context, any of the remote DU and the local DU may for example also be referred to as a Baseband Unit, BBU, processing baseband signals and being connected to the core network by a backhaul link, although the solution is not limited in this respect.

In this solution, the remote DU basically acts as a "master" while the local DU acts as a "slave" in the sense that the remote DU controls operation of the local DU for the radio communication, e.g. by checking information about the terminal maintained in the core network and by instructing the local DU to locally process signals to or from the mobile terminal in the radio communication, and so forth. The remote DU is also responsible for scheduling signals over a radio interface between the mobile terminal and the access point during the radio communication. Thereby, the scheduling can be made centrally with consideration to other communications going on in the cellular network such that the performance of the cellular network may be optimized or improved. During the radio communication, the remote DU continuously sends updated scheduling information to the local DU such that the latter unit is able to momentarily handle the radio communication with the mobile terminal according to the updated scheduling information.

In this way, the necessary intelligence and complexity can be placed in the remote DU while the local DU may be a much simpler component that can be installed at the local site with quite limited costs since it is only required to act according to instructions and scheduling information from the remote DU. It is an advantage that an operator of the cellular network is able to fully control the radio communication at the local site by means of the remote DU while the above-described tromboning of signals over the core network can be avoided without requiring a full base station equipment at the local site. It is thus also an advantage that radio access can be provided at the local site without requiring substantial costs for installing and maintaining equipment at the local site. Yet another advantage is that if a mobile terminal can be served locally by the local DU without routing the communicated signals over the core network, the core network will be relieved from the load of conveying and processing all these signals. Thus, no resources in the core network need to be used and occupied for the signal flow and latency in the communication may also be reduced.

Figure 3:
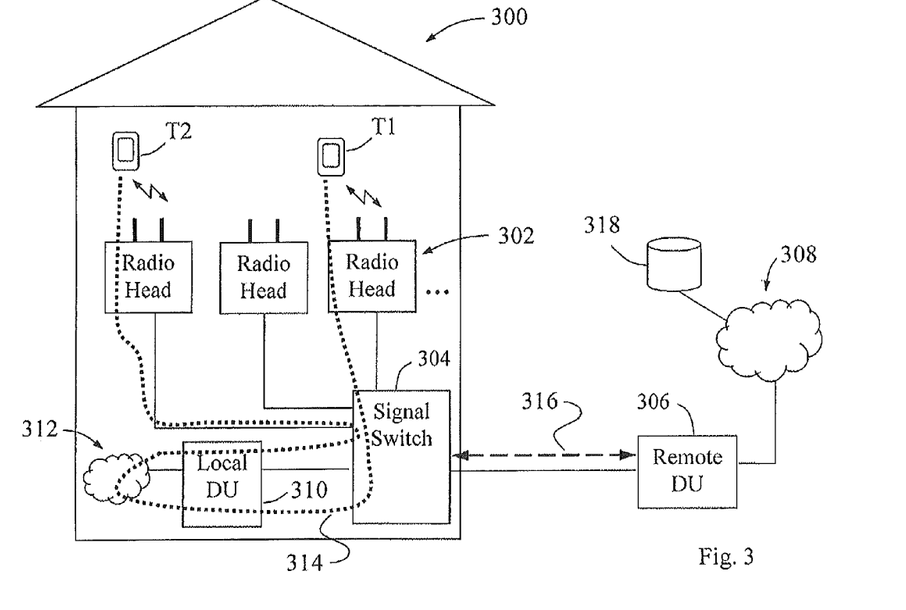
FIG. 3 is a communication scenario illustrating the signal path of a radio communication with a mobile terminal at a local site, according to some possible embodiments.

An example of a communication scenario where the solution is used will now be outlined with reference to FIG. 3. In this scenario, radio access is provided for mobile terminals at a local site 300, schematically illustrated as a building although the solution is not limited thereto. While two mobile terminals T1 and T2 are shown, it should be understood that any number of mobile terminals may be served at the local site 300, including just one, in accordance with this solution as described herein. The term "local site" used in this disclosure has been defined and explained above. At the local site 300, a plurality of access points 302 have been installed which are all connected to a local signal switching unit 304 which in turn is further connected to a remote DU 306 by means of a remote communication link denoted 316. Each access point 302 comprises at least an antenna and may also comprise a radio head as shown in the figure. The solution is basically applicable in local sites with any number of access points, thus also in the case when there is only one access point at the local site 300.

The remote DU 306 is implemented in a central office or the like associated with a core network and remote from the local site 300. The core network is part of a public cellular network maintained and controlled by a network operator, and numeral 308 can be seen as representing the cellular network and its core network. The access points 302 can be seen as network nodes covering micro, pico or femto cells or the like within a macro cell of the cellular network, although the solution is not limited to such a hierarchical cell structure. Of course, the cellular network may comprise a multitude of cells and base stations serving the cells which is however outside the scope of this disclosure.

At the local site 300, a local DU 310 is also installed which is connected to the signal switching unit 304 and also to a local network 312 which comprises one or more servers and switches that can be used to serve the terminals locally without having to route signals of the radio communication over the core network 308. The local network 312 may be physically located within the local site 300 or at some other location, without limitation, and it can be regarded as a private or proprietary network or the like as opposed to the public cellular network 308. Although the local network 312 is depicted inside local site 300, it may be connected to one or more other local sites as well and the solution is not limited in this respect.

For example, the local site 300 may be an office of a company, organization or other enterprise having its own local network and servers therein configured to operate exclusively for users within the office, e.g. in agreement with the network operator and having a license to operate in the related frequency band(s). The local network 312 may further comprise a local Serving Gateway, SGW, configured for handling communications locally at the local site 300. The local network 312 may also be connected to any public external networks as well, such as the Internet, not shown.

Users that in some sense belong to the local site 300, e.g. employees of a company or other enterprise therein, may have been registered and classified in the public cellular network as users that can be served locally when present at the local site 300. In this context, a registered "user" may be a person using one or more terminals or a terminal used by one or more persons. To mention a few possible examples, a particular person may be served locally at the local site 300 regardless of which terminal he/she is using, or a particular terminal may be served locally at the local site 300 while it can be used by more than one person.

When the core network 308 detects that a mobile terminal, such as terminal T1 in this example, is present at the local site 300, the remote DU 306 may determine that the mobile terminal T1 can be served locally during any forthcoming radio communication based on a user classification of the mobile terminal T1, or its user, which has been registered and maintained in the cellular network 308. The core network 308 may detect that terminal T1 is present at the local site 300 through measurements that terminals regularly perform on their radio environment. In general, users and terminals in the cellular network may be classified either as locally served users or remotely served users. If the user classification indicates that the mobile terminal T1 is regarded as a locally served user/terminal, the remote DU 306 sends an instruction to the local DU 310 to locally process signals to or from the mobile terminal T1 in a radio communication with the terminal.

As indicated above, the remote DU 306 may determine that the mobile terminal T1 can be served locally by the local digital unit when the core network 308 detects that terminal T1 can be connected to the access point in the local site. For example, the core network 308 may detect that terminal T1 is present at the local site 300 while T1 is connected to a macro cell of the cellular network 308 and provides reports with measurements of signals transmitted from one or more of the access points 302. These signal measurements may thus indicate that terminal T1 is close to at least one of the access points 302 and the cellular network 308 may then inform the remote DU 306 accordingly. Another option that may be used is to detect that terminal T1 is present at the local site 300 based on an estimated geographic position of the terminal T1, which may be estimated based on, e.g., triangulation calculations made by the network 308 or Global Positioning System, GPS, signals received at the terminal T1.

The above-described procedure of detecting the terminal T1 and instructing the local DU 310 to serve T1 locally is performed in an initial "setup phase" of this solution, Whenever a radio communication actually starts with the terminal T1 over an access point 302, involving uplink signals or downlink signals or both, a "run phase" of the solution takes place as follows. For example, the radio communication may involve a session of communicating data with another terminal T2 present at the local site 300 or elsewhere, or with a server in the local network 312, or with any other communicating party such as a service provider or user outside the local network 312, e.g. in the Internet. This solution is thus not limited to any particular type of session or other communicating party.

In the foregoing setup phase, the local DU 310 was instructed by the remote DU 306 to locally process signals to or from the mobile terminal T1 in a radio communication with the terminal T1. Whenever the signal switching unit 304 receives signals with pending data to be transmitted to or from terminal T1 over the radio interface during the subsequent run phase, which will be described in more detail later below, the signal switching unit 304 transparently forwards these signals to the remote DU 306 and the remote DU 306 is then able to schedule the signals over a radio interface between the mobile terminal T1 and the access point 302 during the radio communication. The scheduling of signals is dependent of which radio technology is used and involves allocation of radio resources, e.g. defined by one or more of frequency, time and code, which is well-known in the art and outside the scope of this disclosure.

For example, the terminal T1 may send a request over the access point 302 for transmitting pending data in uplink signals, and the signal switching unit 304 forwards this request to the remote DU 306 which then schedules uplink signals for the terminal T1 over the radio interface. Scheduling the signals may comprise allocating radio resources for a radio bearer established for the mobile terminal on the radio interface. In another example, the local DU 310 may receive data from the local network 312 which data is to be transmitted in downlink signals to the terminal T1. The local DU 310 temporarily stores the received data in a buffer or the like and sends information on the data pending in the buffer to the signal switching unit 304 which forwards them to the remote DU 306. The remote DU 306 then schedules downlink signals for the terminal T1 over the radio interface. In fact, the remote DU 306 acts effectively as a scheduler for all local DUs it controls, including the local DU 310.

In either case, that is regardless of whether there are uplink signals or downlink signals that have been scheduled, or both, the remote DU 306 sends updated scheduling information regarding the scheduled signals to the local DU 310 over the link 316 to the signal switching unit 304. In the run phase, the remote DU 306 may send such updated scheduling information to the local DU 310 very frequently, e.g. once every millisecond, at least during periods when there is pending data to be communicated in signals between the terminal T1 and the access point 302.

A procedure with actions performed by a remote DU for handling a radio communication for a mobile terminal being connected to an access point at a local site, will now be described with reference to the flow chart in FIG. 4. This procedure may be applied in the scenario depicted in FIG. 3 such that it is performed by the remote DU 306. It is assumed that the remote DU is capable of signal processing and is implemented in a central office, or similar, associated with a core network and being remote from the local site, and that the core network is part of a public cellular network. The signal processing may comprise processing baseband signals. It is also assumed that one or more access points, each having at least an antenna, are present at the local site. The remote DU is connected to a signal switching unit at the local site via a remote communication link, as described above.

In a first shown action 400, the remote DU detects that the mobile terminal is present in the local site and can be connected to an access point of the local site. Some possible options of how a mobile terminal can be detected have been described above. The remote DU then obtains a user classification of the detected terminal, in an action 402, in order to determine whether the terminal can be served locally or not. The user classification may be obtained from the cellular network, e.g. from a Mobility Management Entity, MME, or other corresponding core control node which normally handles various information about terminals and users in the cellular network which information is held in a database such as a Home Location Register, HLR, or a Home Subscription Service, HSS.

Hence, the remote DU moves to a next action 404 and determines whether the mobile terminal can be served locally by a local DU associated with the local site. It is assumed that the local DU is capable of signal processing, e.g. processing baseband signals, and that it is connected to a local signal switching unit at the local site which in turn is attached to the remote communication link extending to the remote DU. The local DU may be placed at the local site or elsewhere and the solution is not limited in this respect. For example, the local DU may be placed in a server room or the like shared by several local sites such as the one described here.

If it is determined in action 404 that the mobile terminal cannot be served locally by the local DU, the signals in the forthcoming radio communication are processed in the remote DU in an action 406. On the other hand, if it is found that the mobile terminal can be served locally by the local DU, the process moves to action 408 where the remote DU instructs the local DU to locally process signals to or from the mobile terminal in the radio communication. This instruction may be sent over a high speed Control & Management, C&M, channel that may be implemented on the remote communication link between the local signal switching unit and the remote DU.

When the remote DU detects that there is pending data or other signals to be communicated with the terminal, either by receiving a request from the terminal for transmitting data or by receiving information from the local DU about pending data addressed to the terminal, the remote DU schedules radio resources for the terminal, in an action 410, to be used for communicating the pending data over the radio interface. The remote DU may further schedule radio resources for other transmissions in the cellular network as well in a coordinated manner, which may involve any amount of locally and/or non-locally served terminals, to optimize the performance in the network. The remote DU may maintain a scheduling table or the like holding information on various scheduled resources on a continuous basis such that the scheduling table is constantly updated whenever radio resources are being scheduled or released, e.g. in an area of macro cell in which the local site is located.

A further action 412 illustrates that the remote DU sends updated scheduling information, e.g. the above-described scheduling table, to the local DU during the radio communication to indicate the scheduling of said signals over the radio interface. Thereby, the local digital unit is enabled to handle, or execute, the radio communication over the radio interface according to the updated scheduling information, i.e. for communicating the signals over the radio resources allocated to the mobile terminal according to the updated scheduling information.

Like the above instruction, the updated scheduling information may also be sent from the remote DU over a high speed C&M channel on the remote communication link to the local signal switching unit which in turn forwards the scheduling information to the local DU. An arrow from 412 back to 410 illustrates that these two actions may be constantly repeated, e.g. in the magnitude of once every millisecond, at least during a period of activity in the radio communication when there is data to communicate.

Some optional embodiments are possible to use in the above procedure. In a possible embodiment, the remote DU may determine that the mobile terminal can be served locally based on a user classification of the mobile terminal indicating that the mobile terminal is a locally served user, which user classification of the mobile terminal is maintained in the cellular network. As mentioned above, the remote digital unit may obtain the user classification from an MME or other corresponding core control node in the cellular network. In that case, the remote digital unit may obtain from the MME an IP address of an SGW that may reside at the local site or elsewhere, and may then instruct the local digital unit to forward uplink signals from the mobile terminal to the IP address of the SGW.

Further, the remote DU may determine that the mobile terminal can be served locally by the local DU when the core network detects that the mobile terminal can be connected to the access point in the local site. As said above, the remote digital unit communicates with the local digital unit over a C&M channel. The C&M channel may be a Common Public Radio Interface, CPRI, embedded C&M channel, or any other suitable channel e.g. based on a separate Ethernet or other packet switching scheme. Although CPRI is used in several examples described below, it should be noted that the solution is not limited thereto and any other suitable channel, e.g. packet-based or analog, may likewise be used in the communication between the remote DU and the local DU.

Figure 4:
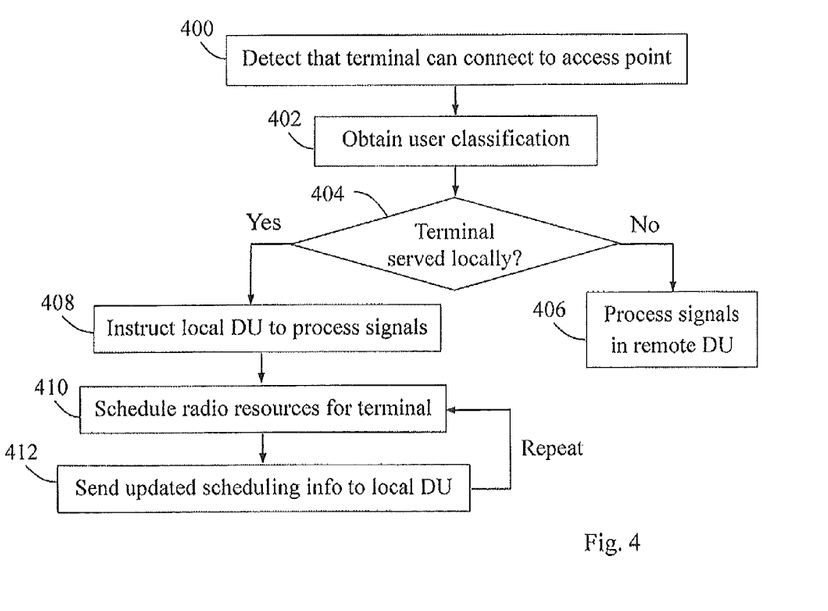
FIG. 4 is a flow chart illustrating a procedure in a remote digital unit, according to further possible embodiments.
Figure 5A:
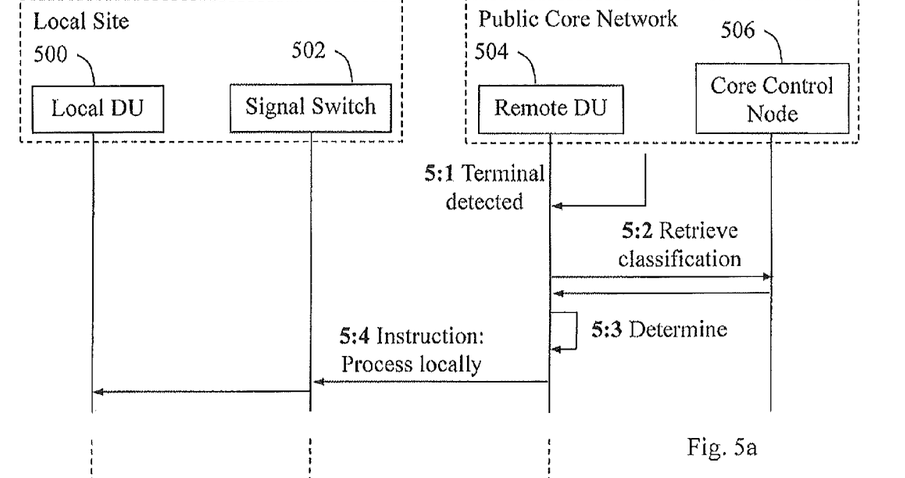
FIG. 5*a* is a signaling diagram illustrating an example of a procedure for setting up a radio communication with a mobile terminal to be served by a local digital unit at a local site, according to further possible embodiments.
Figure 5B:
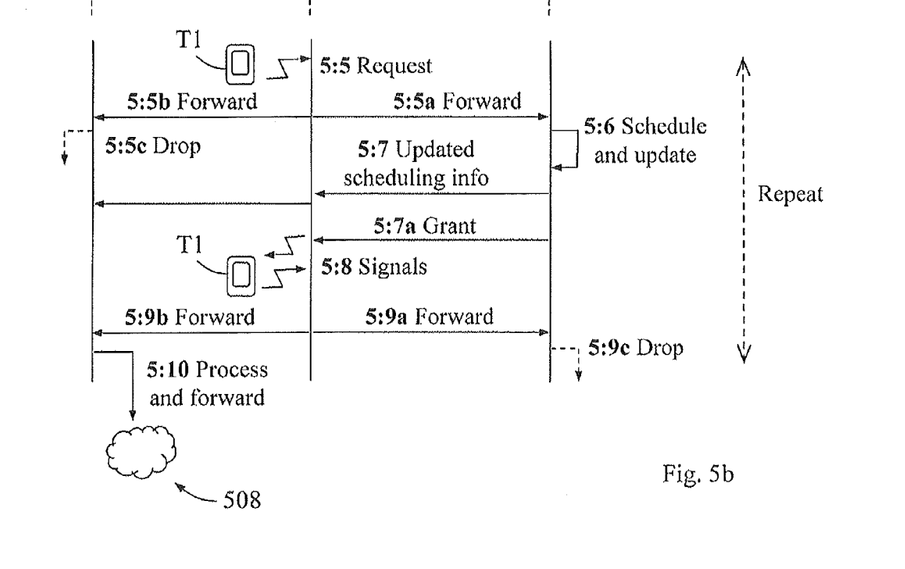
FIG. 5*b* is a signaling diagram illustrating an example of a procedure when uplink signals are received from the mobile terminal to be served by the local digital unit after the setup procedure of FIG. 5*a* has been made, according to further possible embodiments.
Figure 6:
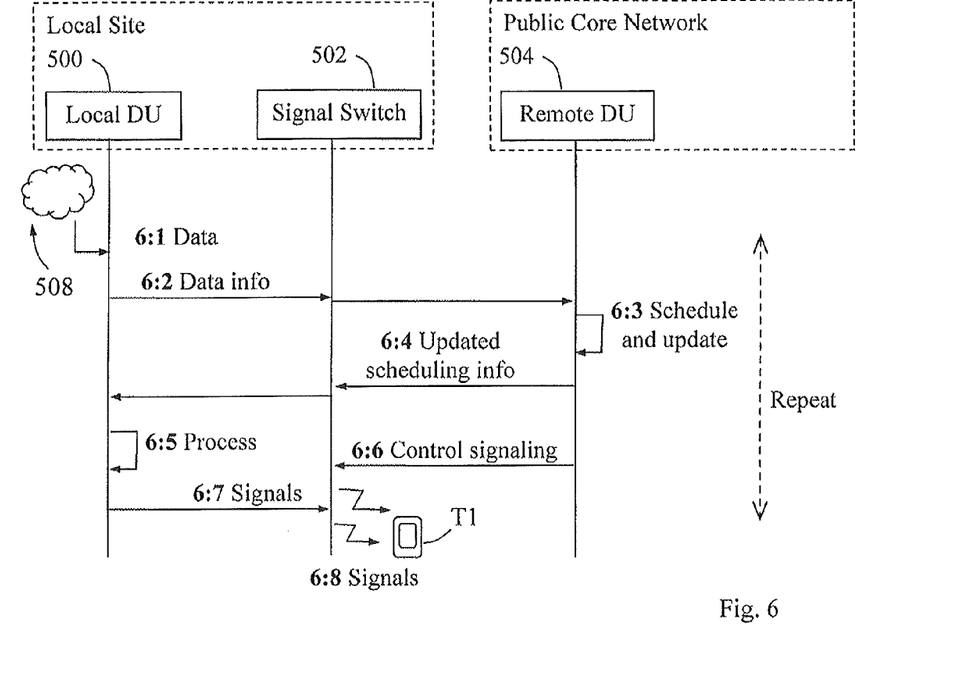
FIG. 6 is a signaling diagram illustrating an example of a procedure when downlink signals are transmitted to the mobile terminal to be served by the local digital unit after the setup procedure of FIG. 5*a* has been made, according to further possible embodiments.

At least some of the actions in FIG. 4 may be executed in various optional ways, e.g. depending on whether the radio communication involves uplink transmissions from the mobile terminal or downlink transmissions from the access point towards the terminal, or both. The signaling diagrams shown in the following FIGS. 5a, 5b and 6 illustrate some examples of how the procedure in FIG. 4 may be realized in practice for handling a radio communication for a mobile terminal T1 being connected to an access point at a local site. These examples may further be executed in the scenario illustrated in FIG. 3, and accordingly involves a local DU 500 and a local signal switching unit 502 implemented at the local site where the mobile terminal T1 is present, and also involving a remote DU 504 implemented in a central office associated with a public core network of a public cellular network. The core network also contains some core control node 506 which is connected to a database such as an HLR, or an HSS, which database holds various information on terminals and users including the above-described user classification indicating whether a terminal can be served locally at the local site or not.

Firstly, FIG. 5a illustrates an example procedure for how the above-described setup phase may be realized, which may be practiced regardless of whether the radio communication will be uplink or downlink or both. Secondly, FIG. 5b illustrates an example procedure for how the above-described run phase may be realized in the case of uplink transmission, and thirdly, FIG. 6 illustrates an example procedure for how the above-described run phase may be realized in the case of uplink transmission. In these examples, the setup phase of FIG. 5a is performed once in preparation for the radio communication while the run phase of FIG. 5b or 6 is performed repeatedly multiple times, as also explained above. FIGS. 5b and 6, respectively, can be seen as continuations from FIG. 5a.

The setup phase in FIG. 5a starts with detection of the mobile terminal at the local site by the remote DU 504 in an action 5:1, which may be attained in different possible ways, e.g. by means of signal measurements by the terminal or determination of its geographical position, as explained above. A next action 5:2 illustrates that the remote DU 504 retrieves the user classification of the detected terminal from the core control node 506. The remote DU 504 further determines from the retrieved user classification that the mobile terminal can be served locally by the local digital unit, in another action 6:3, which basically corresponds to action 404 above. The remote DU 504 then sends an instruction to the local DU 500 in action 6:4, which is received by the signal switching unit 502 and forwarded to the local DU 500, to locally process signals to or from the mobile terminal in the radio communication. This action basically corresponds to action 408 above and completes the setup phase. The local DU 500 is now prepared to process any signals communicated to or from the mobile terminal once the radio communication starts as of either FIG. 5a or FIG. 6.

Turning to the uplink case of FIG. 5b, the run phase may effectively be triggered when the terminal T1 connects to the access point of the local site and has pending data in its buffer to transmit. According to regular procedures, the terminal therefore sends a request to the network for a radio resource to use for the uplink transmission of signals containing the data, which request is received by the local signal switching unit 502 in an action 5:5 and forwarded by unit 502 to the remote DU 504 in another action 6:6a and also simultaneously to the local DU 500 in an action 5:5b. This request may be a "request for grant" or similar message, depending on the protocol used. It should be noted that the local signal switching unit 502 forwards all incoming uplink signals to both the remote DU 504 and the local DU 500. In this case, the local DU 500 will not process the signals of the request which is simply dropped in an action 5:5c, since it is not relevant for the local DU 500.

The remote DU 504 then schedules the forthcoming uplink signals over the radio interface by allocating radio resources for the terminal on the uplink in accordance with the request, in a further action 5:6, which basically corresponds to action 410 above. The remote DU 504 further updates a scheduling table or the like by entering the scheduling of the terminal and further sends updated scheduling information accordingly in an action 5:7, which information is likewise received and forwarded to the local DU 500 by the signal switching unit 502 as shown in the figure. This action basically corresponds to action 412 above. The scheduling table sent from the remote DU 504 may also comprise scheduling information about other mobile terminals present at the local site. The local DU 500 may thus maintain a copy of the above scheduling table, or at least a version with all terminals at the local site only, and update it each time new updated scheduling information is received from the remote DU 504 concerning users at the local site. In this way, the remote DU 504 and the local DU 500 will share the same scheduling table, at least concerning the users and terminals at the local site, at all times.

It is also assumed that the mobile terminal T1 receives from the network a message, shown as action 6:7a, that indicates the allocated uplink resources which the terminal T1 can use for transmitting its data. This message may be an access grant message or the like sent on a specific control channel monitored by the terminal, according to well-known procedures which are not necessary to describe here in any detail.

A next action 6:8 illustrates that the terminal T1 sends uplink signals on the allocated radio resources according to the scheduling made by the remote DU 504 in action 5:6. The uplink signals propagate through the antenna of the access point and arrive in the signal switching unit 502 which immediately and simultaneously forwards the uplink signals both to the remote DU 504 in action 5:9a and to the local DU 500 in action 5:9b. However, the remote DU 504 will not process the uplink signals which are simply dropped in an action 5:9c, since they are not relevant for the remote DU 504.

For example, the signal switching unit 502 may be a radio unit configured to receive the signals in analog form or as CPRI signals, and in the former case the radio unit may be configured to encode the analog signals into CPRI signals. The CPRI signals in either case are then forwarded to both a local output port of unit 502 connected to the local DU 500 and to a remote output port of unit 502 connected to the remote DU 504. Thus, the same data is received both by the remote DU 504 and the local DU 500.

A final shown action 5:10 illustrates that the local DU 500 processes the incoming signals in a fitting manner according to the instruction of action 5:4. For example, the local DU 500 may demodulate the signals to extract data therefrom and forward the data in a suitable packet format to an SOW in a local network 508 which in turn may send them to a server or to another communicating party, which is however outside the scope of this disclosure. As indicated by the dashed two-way arrow, actions 5:5-5:10 will typically be repeated rapidly multiple times basically as long as there are any signals coming from the antennas at the local site, in the manner explained for actions 410, 412 above.

Turning to the downlink case of FIG. 6, which may alternatively follow after the procedure of FIG. 5a, the run phase may effectively be triggered when data addressed to the mobile terminal T1 is received by the local DU 500, e.g. from the local network 508 as shown, in an action 6:1. The local DU 500 then temporarily saves the data in a buffer and sends information on the buffered data to the remote DU 504 via the signal switching unit 502, as shown in another action 6:2. When receiving this data information, the remote DU 504 schedules downlink signals over the radio interface by allocating radio resources for the terminal in accordance with the data information, in a further action 6:3, which basically corresponds to action 410 above.

The remote DU 504 further updates a scheduling table or the like by entering the scheduling of the terminal on the downlink and further sends updated scheduling information accordingly in an action 6:4, which basically corresponds to action 412 above. This information is likewise received and forwarded to the local DU 500 by the signal switching unit 502 as shown in the figure. Similar to the uplink case, the scheduling table sent from the remote DU 504 may also comprise scheduling information about other mobile terminals present at the local site, and the local DU 500 may maintain a copy of the above scheduling table, at least concerning the users at the local site, and update it accordingly.

Upon receiving the updated scheduling information, the local DU 500 is able to process the data in an action 6:5 by encoding and modulating the data onto radio signals, among other things. The remote DU 504 further sends control signaling to the terminal T1 via the signal switching unit 502, in another action 6:6, to inform the terminal T1 about the scheduled radio resources. The signals processed by the local DU 500 in action 6:5 are forwarded to the signal switching unit 502 in an action 6:7. The radio signals are finally transmitted from the access point as indicated by an action 6:8. As indicated here as well by a dashed two-way arrow, actions 6:1-6:8 will typically be repeated rapidly multiple times as long as there are signals to transmit, likewise in the manner explained above for actions 410, 412. It should be noted that as long as the transmitter of the antenna is active, the remote DU 504 may in practice always and continuously transmit signals via the signal switch 502, even if there are no terminals at the local site operating to receive the signals.

Figure 7:
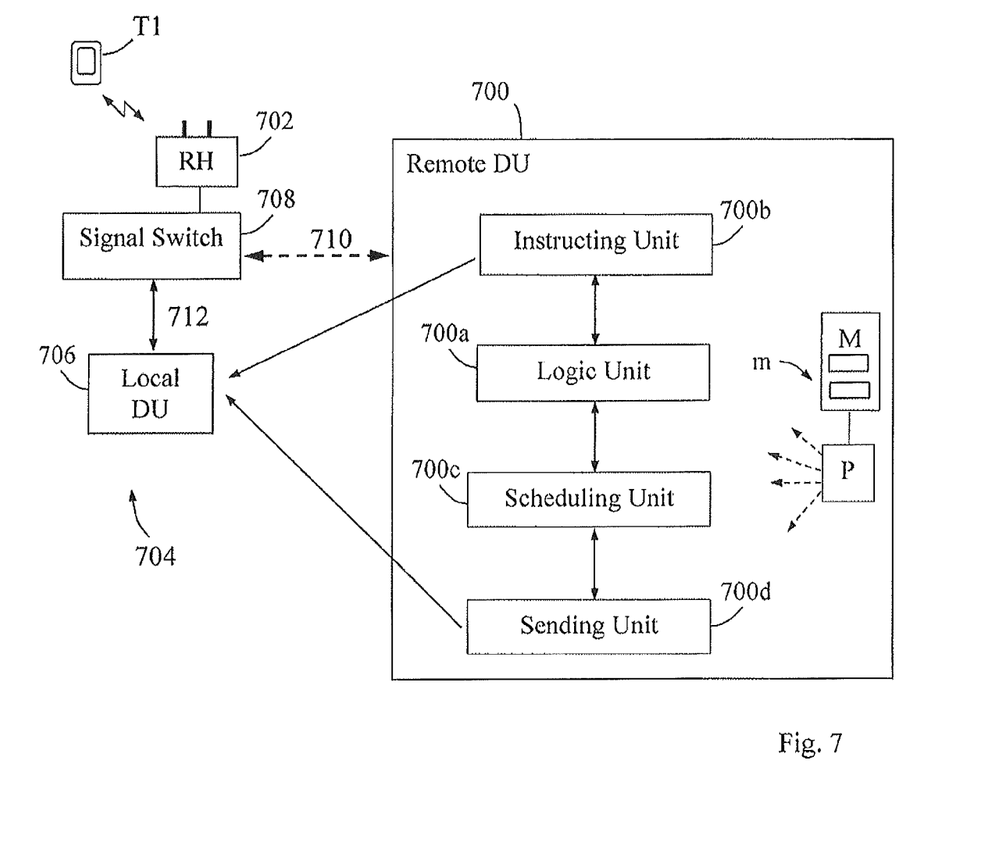
FIG. 7 is a block diagram illustrating a remote digital unit in more detail, according to further possible embodiments.

A detailed but non-limiting example of how a remote Digital Unit, DU, may be structured with some possible functional units to bring about any of the above-described procedures and features, is illustrated by the block diagram in FIG. 7. In this figure, the remote DU 700 is configured to handle a radio communication for a mobile terminal T1 being connected to an access point 702 at a local site 704. The remote DU 700 is capable of signal processing and is implemented in a central office associated with a core network and being remote from the local site, and the core network is part of a public cellular network. The remote DU 700 may be configured to operate according to any of the examples and embodiments described above and as follows. The remote DU 700 will now be described in terms of some possible examples of employing the solution. It should be noted that only functional units employed specifically for this solution will be explained while other units and components involved in normal structure and operation of a DU are omitted.

The remote DU 700 comprises a logic unit 700a which is configured to determine that the mobile terminal T1 can be served locally by a local DU 706 associated with the local site 704. The local DU 706 is likewise capable of signal processing and it is connected to a local signal switching unit 708 at the local site 704. The logic unit 700a may thus operate as described for actions 400-404 and 5:1-5:3 above. The above signal processing may comprise processing baseband signals. The remote DU 700 also comprises an instructing unit 700b configured to instruct the local digital unit to locally process signals to or from the mobile terminal in the radio communication. The instructing unit 700b may thus operate as described for actions 408 and 5:4 above.

The remote DU 700 further comprises a scheduling unit 700c configured to schedule the signals over a radio interface between the mobile terminal T1 and the access point 702 during the radio communication. The scheduling unit 700c may thus operate as described for actions 410, 5:6 and 6:3 above. The scheduling unit 700c may further operate normally for other functions which are outside the scope of this solution and not necessary to described here. The remote DU 700 further comprises a sending unit 700d configured to send updated scheduling information to the local digital unit 706, to indicate the scheduling of the signals over the radio interface. Thereby, the local DU 706 is enabled to handle and execute the radio communication over the radio interface according to the updated scheduling information. The sending unit 700d may thus operate as described for actions 412, 5:7 and 6:4 above.

It should be noted that FIG. 7 illustrates various functional units in the remote DU 700, and the skilled person is able to implement these functional units in practice using suitable software and hardware. Thus, the solution is generally not limited to the shown structures of the remote DU 700, and the functional units 700a-d may be configured to operate according to any of the features described in this disclosure, where appropriate.

The above remote DU 700 and its functional units 700a-d may be configured or adapted to operate according to various optional embodiments. In a possible embodiment, the logic unit 700a may be configured to determine that the mobile terminal T1 can be served locally based on a user classification of the mobile terminal indicating that the mobile terminal is a locally served user, which user classification of the mobile terminal is maintained in the cellular network. In this case, the logic unit 700a may be configured to obtain the user classification from an MME or other corresponding core control node in the cellular network, not shown here. Further, the logic unit 700a may be configured to obtain from the MME an IP address of an SGW serving the local site and the instructing unit 700b may be configured to instruct the local digital unit to forward uplink signals from the mobile terminal to the IP address of the SGW.

In another possible embodiment, the logic unit 700a may be configured to determine that the mobile terminal T1 can be served locally by the local DU 706 when the core network detects that the mobile terminal can be connected to the access point in the local site. In yet another possible embodiment, the scheduling unit 700c may be configured to schedule the signals over the radio interface by allocating radio resources for a radio bearer that has been established for the mobile terminal.

The remote DU 700 may further be configured to communicate with the local DU 706 over a C&M channel which may be a CPRI embedded C&M channel, although the solution is not limited thereto.

The embodiments and features described herein may be implemented in a computer program comprising computer readable code which, when run on a remote DU, causes the remote DU to perform the above actions e.g. as described for the remote DU 306 in FIG. 3 and the appropriate actions by the remote DU described for FIGS. 4-6, and the remote DU 700 in FIG. 7. Further, the above-described embodiments may be implemented in a computer program product comprising a computer readable medium on which a computer program is stored. The computer program product may be a compact disc or other carrier suitable for holding the computer program. The computer program comprises computer readable code which, when run on a remote DU, causes the remote DU to perform the above actions. Some examples of how the computer program and computer program product can be realized in practice are outlined below.

With reference to FIG. 7, the functional units 700a-d described above may be implemented in the remote DU 700 by means of program modules of a respective computer program comprising code means which, when run by a processor "P" in the remote DU 700 causes the remote DU 700 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the remote DU 700 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the remote DU 700.

Another example of how some embodiments of the solution may be put into practice will now be described with reference to FIG. 8. In this example, it is described how the core network may be involved when using the solution.

For a mobile terminal to connect to a cellular network by means of standard procedures, i.e. in the case where the signal path is routed through the core network in a conventional manner, the terminal will use appropriate signaling radio bearers to a DU to exchange signaling messages with an MME over an S1-MME interface. The MME will consult an HSS in the network via an S6a interface to retrieve subscriber data of the terminal, before setting up radio bearers for data communication. The MME will then ensure that such bearers are established from the terminal across the network to an appropriate PGW, the latter leading to a packet network via an SGi interface.

Figure 8:
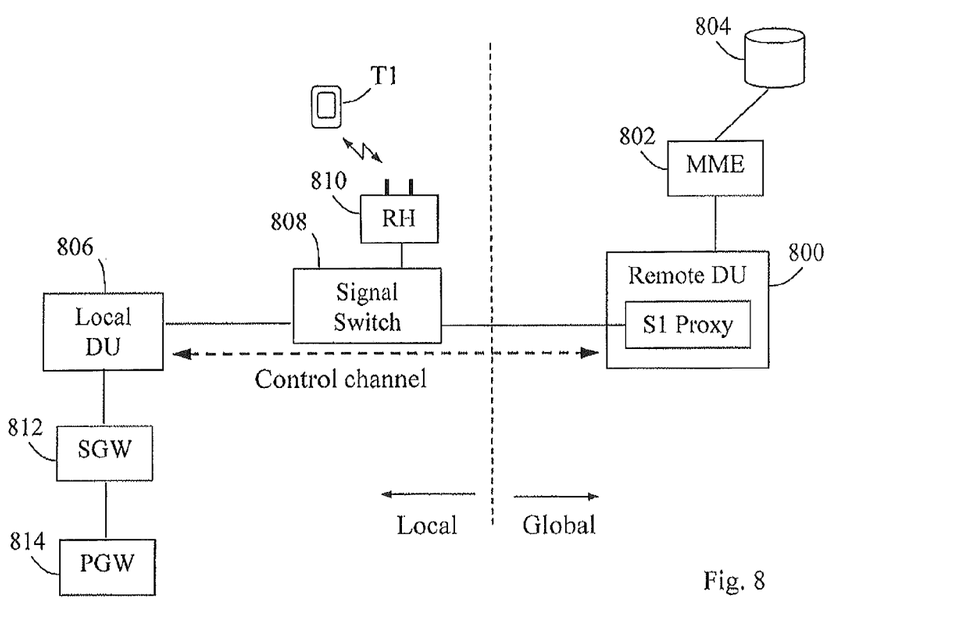
FIG. 8 is a block diagram illustrating an example of how the solution may be implemented in practice, according to further possible embodiments.

In FIG. 8, the above-described components involved in the solution are as follows. A remote DU 800 of a cellular network is connected to a core control node, in this case an MME 802 which in turn is connected to a database 804, e.g. an HLR or an HSS. Further, a local DU 806 associated with a local site is connected to a local signal switching unit 808 to which an access point 810 is connected. The local signal switching unit 808 may be a radio unit or similar, as described above. The local DU 806 is also connected to a local SGW 812 and a local Packet data network Gateway, PGW 814 which may both reside in a local network serving the local site. There may be a global SGW and a global PGW residing in the global part of the network as well, not shown, which are not involved in the shown example. A dashed line in the figure divides the components into local components 806-814 associated with the local site and "global" components 800-804 belonging to the public cellular network. Throughout this example, the term "global" may be exchanged for the term "public" which was used in the description above.

According to standard procedures, the mobile terminal T1 constantly measures its environment and sends information towards its MME 802 about measurements on downlink signals from cells that it discovers. So, if the terminal T1 enters the local site whilst being connected to a macro cell, the MME 802 will detect this at some point based on the reported measurements or otherwise, as explained above. Alternatively, the terminal T1 is turned on in the local site and connects to the access point 810 directly. Irrespective of this, the global part of the network will normally connect the terminal T1 as in the standard procedure. It will also perform handover as normal, e.g. from a macro cell to an indoor cell at the local site, when served by the remote DU 800.

At some point in time, based on user/terminal information in the database 804, the cellular network will decide that the terminal T1 should be served by the local DU 806, the local SGW 812 and the local PGW 814. For example, the information in the database 804 may state that all "Company_X" mobile terminals of a particular identity, e.g. their respective International Mobile Subscriber Identity, IMSI, numbers, are classified locally served users for and should be treated as such when present in a specific range of COMPANY_X cells. The local PGW 814 then leads to an IT environment of COMPANY_X and ultimately to the Internet.

In order to implement the above solution for routing traffic from the terminal T1 locally, the MME 802 must instruct the terminal T1 to connect to the Local SGW 812. Otherwise, all user data traffic would be tromboned via the global or public core network anyway and the solution herein would not be used. In addition, the prevailing standards of today do not allow that several SGWs serve the same terminal T1 at the same time.

In the database 804, the network address of the new SGW, i.e. local SGW 812, which the terminal should connect to, is stored and retrieved by the MME. The MME 802 will look for the IP address of this Local SGW 812 in order to signal to it via the S1-MME interface. That address will point towards the remote DU 800 where an "S1-proxy" may be implemented configured to eavesdrop on the signaling messages and then convey them unchanged over a control channel to the local DU 806. The control channel between local DU 806 and remote DU 800, schematically illustrated by a dashed two-way arrow in the figure, may be implemented as an IP-over-Ethernet, over embedded CPRI control channels or over a separate digital channel.

The S1-proxy in the remote DU 800 eavesdrops on any signaling messages between MME 802 and the local SGW 812, and may also take care of any necessary signaling over the radio interface if needed.

An advantage of this particular example is that only a single physical connection is needed between the global core nodes 800-804 and the local components 806-814, since the necessary new signaling can be tunneled via the control channel between the remote DU 800 and the local DU 806.

Any terminal requests to/from the network will terminate/originate in/from either the MME 802 (for non-access stratum parts) or the remote DU 800 (for access stratum parts). In case the terminal T1 moves out of radio coverage of the local site, then a regular handover will take place from the local access point 810 to the macro cell, not shown. In case the MME 802 decides to force a terminal from local access to the macro cell, then it can trigger a cell reselection or similar. Another advantage of this solution in general is that since both local and global connectivity is controlled by the core network, charging can in both cases be performed by global charging systems serving the cellular network.

Figure 9:
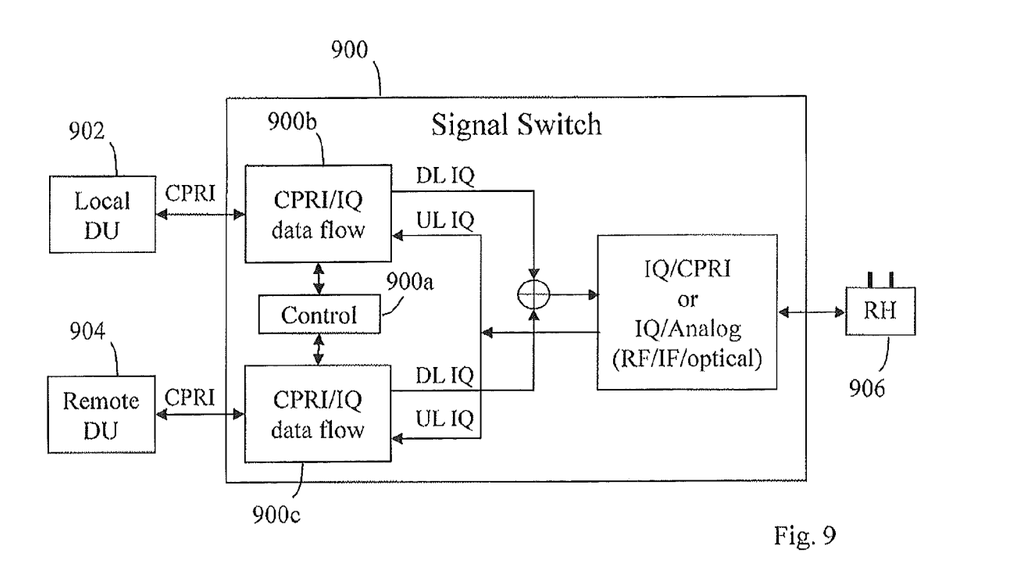
FIG. 9 is a block diagram illustrating an example of how a local signal switching unit may operate when the solution is implemented in practice, according to further possible embodiments.

Another example of how a local signal switching unit, such as any of the above units 304, 502, 708 and 808, may operate when the solution is used in practice, will now be described with reference to the block diagram in FIG. 9. In the following, the local signal switching unit 900 will be referred to as a "signal switch" for short. The exemplary implementation shown here assumes that there are CPRI links between the signal switch 900 and a local DU 902 at a local site and between the signal switch 900 and a remote DU 904 at a central office, respectively. On the opposite side of the signal switch 900, the connection to a radio head 906 with antenna can be a CPRI link which is commonly used in main-remote deployments of radio networks, or an analog link based on analog RF, analog IF, or analog optical (analog fiber) techniques which are usually used in indoor distributed antenna systems (DAS).

The basic functionalities of the signal switch 900 include forwarding signals between the radio head 906 and the local and remote DUs 902, 904, as well as exchanging/forwarding any control or management messages between the local DU 902 and the remote DU 904. For example, this may include a message containing the above-described scheduling table sent from the remote DU 904 to the local DU 902 and the traffic buffer information from the local DU 902 to the remote DU 904. In this example illustrated in FIG. 9, the messages are exchanged via a C&M channel embedded in CPRI. The control block 900a in FIG. 9 performs this functionality of the message exchange.

In UL (uplink) direction involving signals from the radio head side to the DU side, the received UL signals are first converted to IQ signals or IQ data flows. One IQ signal or IQ data flow represents the baseband signal for one Antenna-Carrier signal. Then the UL IQ signals are broadcasted to the two separate blocks 900b and 900c of CPRI/IQ data flow conversion for the remote DU and the local DU, respectively. At the CPRI/IQ data flow conversion blocks 900b and 900c, the UL IQ signals are converted into CPRI signals delivered to the local DU 902 and to the remote DU 904, respectively. In this way, the UL signals are broadcasted back to the both DUs for baseband processing. Each DU only processes its own relevant signals, as described above for FIG. 5b. The local DU only processes the part of the local user traffic, while the remote DU takes care of the public user traffic and the control signaling for all users.

In DL (downlink) direction from the DU side to the radio head, the DL IQ signals from the local DU and the remote DU, respectively, are first extracted from the CPRI signals. Then the DL IQ signals are added together and the sum of the IQ signals are converted to a proper type of signal, e.g. a CPRI signal or an analog signal, according to the radio head type used. The IQ signals from the local DU 902 comprise any DL traffic to local users, while the IQ signals from the remote DU 904 comprise any DL traffic to public or remote users and any control signaling directed to users at the local site. Note that the signal components for different users can be made orthogonal such that the sum of the two IQ signals will comprise signal components directed to all users without interference between signal components from different DUs. In this example, the local DU 902 and the remote DU 904 are fully synchronized via the CPRI interface, meaning the two CPRI/IQ data flow blocks in the signal switch unit are fully synchronized.

While the solution has been described with reference to specific exemplary embodiments, the description is generally only intended to illustrate the inventive concept and should not be taken as limiting the scope of the solution. For example, the terms "local site", "access point", "radio unit", "remote digital unit", "local digital unit" and "scheduling information" have been used throughout this description, although any other corresponding entities, functions, and/or parameters could also be used having the features and characteristics described here. The solution is defined by the appended claims.

The invention claimed is:

1. A method performed by a remote digital unit for handling a radio communication for a mobile terminal being connected to an access point at a local site, wherein the remote digital unit is configured for signal processing and is implemented in a central office associated with a core network and remote from the local site, said core network being part of a public cellular network, the method comprising:
   determining, by using a local digital unit associated with the local site and being configured for signal processing and connected to a local signal switching unit at the local site, whether the mobile terminal can be served locally based on a user classification of the mobile terminal indicating that the mobile terminal is a locally served user, said user classification of the mobile terminal being maintained in the cellular network,
   in response to determining that the mobile terminal can be served locally by the local digital unit,
      instructing the local digital unit to locally process signals to or from the mobile terminal in the radio communication,
      scheduling said signals over a radio interface between the mobile terminal and the access point during the radio communication, and
      sending updated scheduling information to the local digital unit during the radio communication to indicate the scheduling of said signals over the radio interface, thereby enabling the local digital unit to handle said radio communication over the radio interface according to the updated scheduling information; and
   in response to determining that the mobile terminal cannot be served locally by the local digital unit, processing signals to or from the mobile terminal in the radio communication in the remote digital unit.

2. A method according to claim 1, wherein the remote digital unit obtains the user classification from a Mobility Management Entity, MME, or other corresponding core control node in the cellular network.

3. A method according to claim 2, wherein the remote digital unit obtains from the MME or the other corresponding core control node an IP address of a Serving Gateway, SGW, serving the local site and instructs the local digital unit to forward uplink signals from the mobile terminal to the IP address of the SGW.

4. A method according to claim 1, wherein the remote digital unit determines that the mobile terminal can be served locally by the local digital unit when the core network detects that the mobile terminal can be connected to the access point in the local site.

5. A method according to claim 1, wherein scheduling the signals over the radio interface comprises allocating radio resources for a radio bearer established for the mobile terminal.

6. A method according to claim 1, wherein the remote digital unit communicates with the local digital unit over a Control & Management, C&M, channel.

7. A method according to claim 6, wherein the C&M channel is a Common Public Radio Interface, CPRI, embedded C&M channel.

8. A remote digital unit configured to handle a radio communication for a mobile terminal being connected to an access point at a local site, wherein the remote digital unit is configured for signal processing and is implemented in a central office associated with a core network and remote from the local site, said core network being part of a public cellular network, the remote digital unit comprising:
   at least one processor; and
   a memory coupled to the at least one processor and comprising computer readable program code that when executed by the at least one processor causes the at least one processor to perform operations comprising:
      determining, by using a local digital unit associated with the local site and configured for signal processing and connected to a local signal switching unit at the local site, whether the mobile terminal can be served locally based on a user classification of the mobile terminal indicating that the mobile terminal is a locally served user, said user classification of the mobile terminal being maintained in the cellular network,
      in response to determining that the mobile terminal can be served locally by the local digital unit,
         instructing the local digital unit to locally process signals to or from the mobile terminal in the radio communication,
         scheduling said signals over a radio interface between the mobile terminal and the access point during the radio communication, and
         sending updated scheduling information to the local digital unit during the radio communication to indicate the scheduling of said signals over the radio interface, thereby enabling the local digital unit to handle said radio communication over the radio interface according to the updated scheduling information; and
      in response to determining that the mobile terminal cannot be served locally by the local digital unit, processing signals to or from the mobile terminal in the radio communication in the remote digital unit.

9. A remote digital unit according to claim 8, wherein the remote digital unit is further configured to obtain the user classification from a Mobility Management Entity, MME, or other corresponding core control node in the cellular network.

10. A remote digital unit according to claim 9, wherein the remote digital unit is further configured to obtain from the MME or other corresponding core control node an IP address of a Serving Gateway, SGW, serving the local site, and the remote digital unit is further configured to instruct the local digital unit to forward uplink signals from the mobile terminal to the IP address of the SGW.

11. A remote digital unit according to claim 8, wherein the remote digital unit is further configured to determine that the mobile terminal can be served locally by the local digital unit when the core network detects that the mobile terminal can be connected to the access point in the local site.

12. A remote digital unit according to claim 8, wherein the remote digital unit is further configured to schedule the signals over the radio interface by allocating radio resources for a radio bearer established for the mobile terminal.

13. A remote digital unit according to claim 8, wherein the remote digital unit is configured to communicate with the local digital unit over a Control & Management, C&M, channel.

14. A remote digital unit according to claim 13, wherein the C&M channel is a Common Public Radio Interface, CPRI, embedded C&M channel.

15. A computer program product comprising a non-transitory computer readable medium on which a computer program is stored, wherein the computer program comprises computer readable code which, when run on a central processing unit, causes the central processing unit to perform the method according to claim 1.

* * * * *

UNITED STATES PATENT AND TRADEMARK OFFICE
CERTIFICATE OF CORRECTION

| | | |
|---|---|---|
| PATENT NO. | : 9,143,292 B2 | Page 1 of 1 |
| APPLICATION NO. | : 13/993570 | |
| DATED | : September 22, 2015 | |
| INVENTOR(S) | : Lu et al. | |

It is certified that error appears in the above-identified patent and that said Letters Patent is hereby corrected as shown below:

In the specification

Column 3, Line 16, delete "2004/019624" and insert -- 2004/019524 --, therefor.

Column 7, Line 40, delete "solution," and insert -- solution. --, therefor.

Column 9, Line 22, delete "mariner," and insert -- manner, --, therefor.

Column 9, Line 59, delete "SOW" and insert -- SGW --, therefor.

Column 9, Line 62, delete "SOW." and insert -- SGW. --, therefor.

Column 10, Line 54, delete "6:3," and insert -- 5:3, --, therefor.

Column 10, Line 56, delete "6:4," and insert -- 5:4, --, therefor.

Column 11, Line 5, delete "6:6a" and insert -- 5:5a --, therefor.

Column 11, Line 36, delete "6:7a," and insert -- 5:7a, --, therefor.

Column 11, Line 42, delete "6:8" and insert -- 5:8 --, therefor.

Column 11, Line 65, delete "SOW" and insert -- SGW --, therefor.

Signed and Sealed this
Ninth Day of August, 2016

Michelle K. Lee
*Director of the United States Patent and Trademark Office*